(12) United States Patent
Wang et al.

(10) Patent No.: US 12,347,085 B2
(45) Date of Patent: Jul. 1, 2025

(54) METHOD AND DEVICE FOR DETECTING DEFECT, STORAGE MEDIUM AND ELECTRONIC DEVICE

(71) Applicants: Beijing Zhongxiangying Technology Co., Ltd., Beijing (CN); BOE Technology Group Co., Ltd., Beijing (CN)

(72) Inventors: Yaoping Wang, Beijing (CN); Meijuan Zhang, Beijing (CN); Wangqiang He, Beijing (CN); Dong Chai, Beijing (CN); Hong Wang, Beijing (CN)

(73) Assignees: BEIJING ZHONGXIANGYING TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/772,562

(22) PCT Filed: May 21, 2021

(86) PCT No.: PCT/CN2021/095306
§ 371 (c)(1),
(2) Date: Apr. 28, 2022

(87) PCT Pub. No.: WO2022/241784
PCT Pub. Date: Nov. 24, 2022

(65) Prior Publication Data
US 2024/0202893 A1    Jun. 20, 2024

(51) Int. Cl.
*G06T 7/00* (2017.01)
*G06T 7/90* (2017.01)
(Continued)

(52) U.S. Cl.
CPC .............. *G06T 7/0002* (2013.01); *G06T 7/90* (2017.01); *G06V 10/44* (2022.01); *G06V 10/764* (2022.01);
(Continued)

(58) Field of Classification Search
None
See application file for complete search history.

(56) References Cited

U.S. PATENT DOCUMENTS 10,607,331 B1    3/2020  Tandia et al.
10,810,721 B2 *  10/2020  Mech ........................ G06N 3/08
(Continued)

FOREIGN PATENT DOCUMENTS

CN    109711474 A    5/2019
CN    111353413 A    6/2020
(Continued)

OTHER PUBLICATIONS

Written Opinion mailed on Jan. 29, 2022, in corresponding PCT/CN2021/095306, 4 pages.

*Primary Examiner* — Anand P Bhatnagar
(74) *Attorney, Agent, or Firm* — XSENSUS LLP

(57) ABSTRACT

Provided is a method and device for detecting defect, a computer readable storage medium and an electronic device, the method including: acquiring (S310) a detection task, and acquiring various types of images corresponding to the detection task; acquiring (S320) defect detection models trained by a same initial model corresponding to the types of the images respectively; and obtaining (S330) defect detection results by performing defect detection on respective type of images using the defect detection model corresponding to the type of the images.

19 Claims, 5 Drawing Sheets

(51) Int. Cl.
*G06V 10/44* (2022.01)
*G06V 10/764* (2022.01)
*G06V 10/776* (2022.01)

(52) U.S. Cl.
CPC ........ *G06V 10/776* (2022.01); *G06T 2200/24* (2013.01); *G06T 2207/10024* (2013.01); *G06T 2207/20081* (2013.01); *G06T 2207/20092* (2013.01)

(56) References Cited

U.S. PATENT DOCUMENTS

| | | | |
|---|---|---|---|
| 10,957,034 B2* | 3/2021 | Cohen | G06T 5/70 |
| 11,307,150 B2* | 4/2022 | Bar | G03F 7/7065 |
| 11,620,558 B1* | 4/2023 | Xu | G06N 7/01 |
| | | | 706/12 |
| 11,650,576 B2* | 5/2023 | Fang | G06N 5/02 |
| | | | 382/141 |
| 11,846,591 B2* | 12/2023 | Kim | G01N 23/04 |
| 2007/0237399 A1* | 10/2007 | Satonaga | G06V 10/98 |
| | | | 382/225 |
| 2020/0234417 A1* | 7/2020 | Cohen | G06T 5/50 |
| 2020/0355627 A1* | 11/2020 | Wen | G01N 21/95607 |
| 2020/0363341 A1* | 11/2020 | Tsai | G06N 3/08 |
| 2020/0410660 A1 | 12/2020 | Tandia et al. | |
| 2021/0318673 A1* | 10/2021 | Kitchen | G05B 13/048 |
| 2021/0327042 A1* | 10/2021 | Kim | G06F 18/2163 |
| 2022/0050061 A1* | 2/2022 | Bar | G03F 7/7065 |
| 2023/0003663 A1* | 1/2023 | Horita | G06V 10/25 |
| 2023/0288345 A1* | 9/2023 | Bar | G01N 21/9501 |
| 2024/0160194 A1* | 5/2024 | Bakhshmand | G06N 3/047 |
| 2024/0289941 A1* | 8/2024 | Oshima | G01B 11/30 |

FOREIGN PATENT DOCUMENTS

| | | |
|---|---|---|
| CN | 111489339 A | 8/2020 |
| CN | 111951249 A | 11/2020 |
| CN | 112053318 A | 12/2020 |

* cited by examiner

METHOD AND DEVICE FOR DETECTING DEFECT, STORAGE MEDIUM AND ELECTRONIC DEVICE

CROSS REFERENCE

The present application is based upon International Application No. PCT/CN2021/095306, filed on May 21, 2021, and the entire contents thereof are incorporated herein by reference.

TECHNICAL FIELD

The present disclosure relates to the field of defect detecting technology, in particular, to a method and device for detecting defect, a computer readable storage medium and an electronic device.

BACKGROUND

In the field of production and processing technology, due to problems in the aspect of equipment, parameters, operation, environmental interference and the like, the output products will be defective. With the rise of artificial intelligence algorithms represented by deep learning, the use of deep algorithm learning models for defect detection is also used more and more widely.

It should be noted that, information disclosed in the above background portion is provided only for better understanding of the background of the present disclosure, and thus it may contain information that does not form the prior art known by those ordinary skilled in the art.

SUMMARY

The present disclosure objects to provide a method and device for detecting defect, a computer readable storage medium and an electronic device.

According to one aspect, the present disclosure provides a method for detecting defect, including:
  acquiring a detection task, and acquiring various types of images corresponding to the detection task;
  acquiring defect detection models trained by a same initial model corresponding to the types of the images respectively; and
  obtaining defect detection results by performing defect detection on respective type of images using the defect detection model corresponding to the type of the images.

According to second aspect, the present disclosure provides a device for detecting defect, including:
  an image acquiring module, configured to acquire a detection task, and acquire various types of images corresponding to the detection task;
  a module acquiring module, configured to acquire defect detection models trained by a same initial model corresponding to the types of the images respectively; and
  a defect detection module configured to obtain defect detection results by performing defect detection on respective type of images using the defect detection model corresponding to the type of the images.

According to third aspect, the present disclosure provides a computer readable storage medium on which a computer program is stored, and when the computer program is executed by a processor, implements the above-mentioned method.

According to fourth aspect, the present disclosure provides an electrical device including:
  a processor; and
  a memory, configured to store one or more programs, and when the one or more programs are executed by a processor, causes the processor to implement the above-mentioned method.

It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate embodiments consistent with the disclosure and together with the description serve to explain the principles of the disclosure. Obviously, the drawings in the following description are only some embodiments of the present disclosure, and for those of ordinary skill in the art, other drawings can also be obtained from these drawings without creative effort.

DETAILED DESCRIPTION

Figure 1:
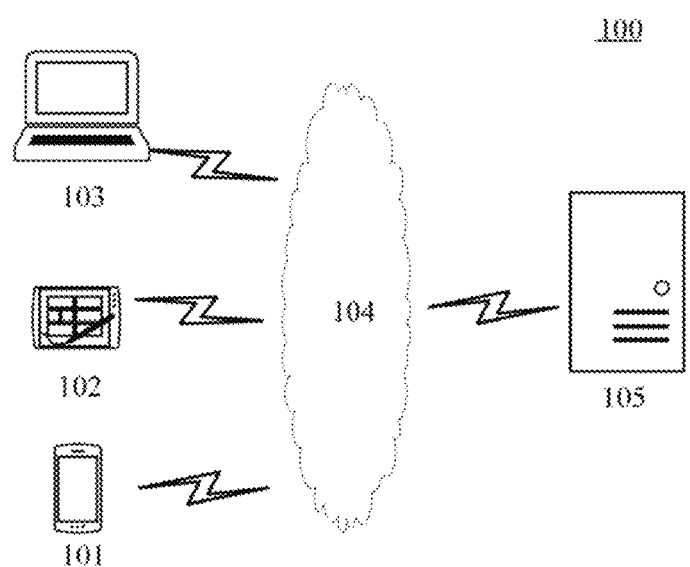
FIG. 1 illustrates a schematic diagram of an exemplary system architecture to which embodiments of the present disclosure may be applied.

Example embodiments will now be described more fully with reference to the accompanying drawings. Example embodiments, however, can be embodied in various forms and should not be construed as limited to the examples set forth herein; rather, these embodiments are provided so that this disclosure will be thorough and complete, and will fully convey the concept of example embodiments to those skilled in the art. The described features, structures, or characteristics may be combined in any suitable manner in one or more embodiments.

Furthermore, the drawings are merely schematic illustrations of the present disclosure and are not necessarily drawn to scale. The same reference numerals in the drawings denote the same or similar parts, and thus their repeated descriptions will be omitted. Some of the block diagrams shown in the figures are functional entities that do not necessarily correspond to physically or logically independent entities. These functional entities may be implemented in software, or in one or more hardware modules or integrated circuits, or in different networks and/or processor devices and/or microcontroller devices.

FIG. 1 illustrates a schematic diagram of an exemplary system architecture to which embodiments of the present disclosure may be applied.

As shown in FIG. 1, the system architecture 100 may include one or more of terminal devices 101, 102 and 103, a network 104 and a server 105. The network 104 is a medium used to provide a communication link between the terminal devices 101, 102 and 103 and the server 105. The network 104 may include various connection types, such as wired, wireless communication links, or fiber optic cables, or the like. The terminal devices 101, 102, and 103 may be various electronic devices with image processing functions, including but not limited to desktop computers, portable computers, smart phones, tablet computers, and the like. It should be understood that the numbers of terminal devices, networks and servers in FIG. 1 are only illustrative. There can be any number of terminal devices, networks, and servers according to implementation needs. For example, the server 105 may be a server cluster composed of multiple servers, or the like.

The method for detecting defect provided by the embodiments of the present disclosure is generally executed in the terminal devices 101, 102, and 103, and correspondingly, the device for detecting defect is generally provided in the terminal devices 101, 102, and 103. However, those skilled in the art can easily understand that the defect detection method provided by the embodiment of the present disclosure may also be executed by the server 105, and correspondingly, the device for detecting defect may also be set in the server 105, which is not specifically required in this exemplary embodiment. For example, in an exemplary embodiment, the user may obtain various types of images corresponding to the product through the terminal devices 101, 102, and 103 according to the product information and upload them to the server 105. The server 105 obtains the defect detection result according to the method for detecting defect provided by the present disclosure, and transmits the detection result to the terminal devices 101, 102, 103 and the like.

Exemplary embodiments of the present disclosure provide an electronic device for implementing a defect detection method, which may be the terminal devices 101, 102, 103 or the server 105 in FIG. 1. The electronic device includes at least a processor and a memory for storing instructions executable by the processor, and the processor is configured to perform the defect detection method by executing the executable instructions.

Figure 2:
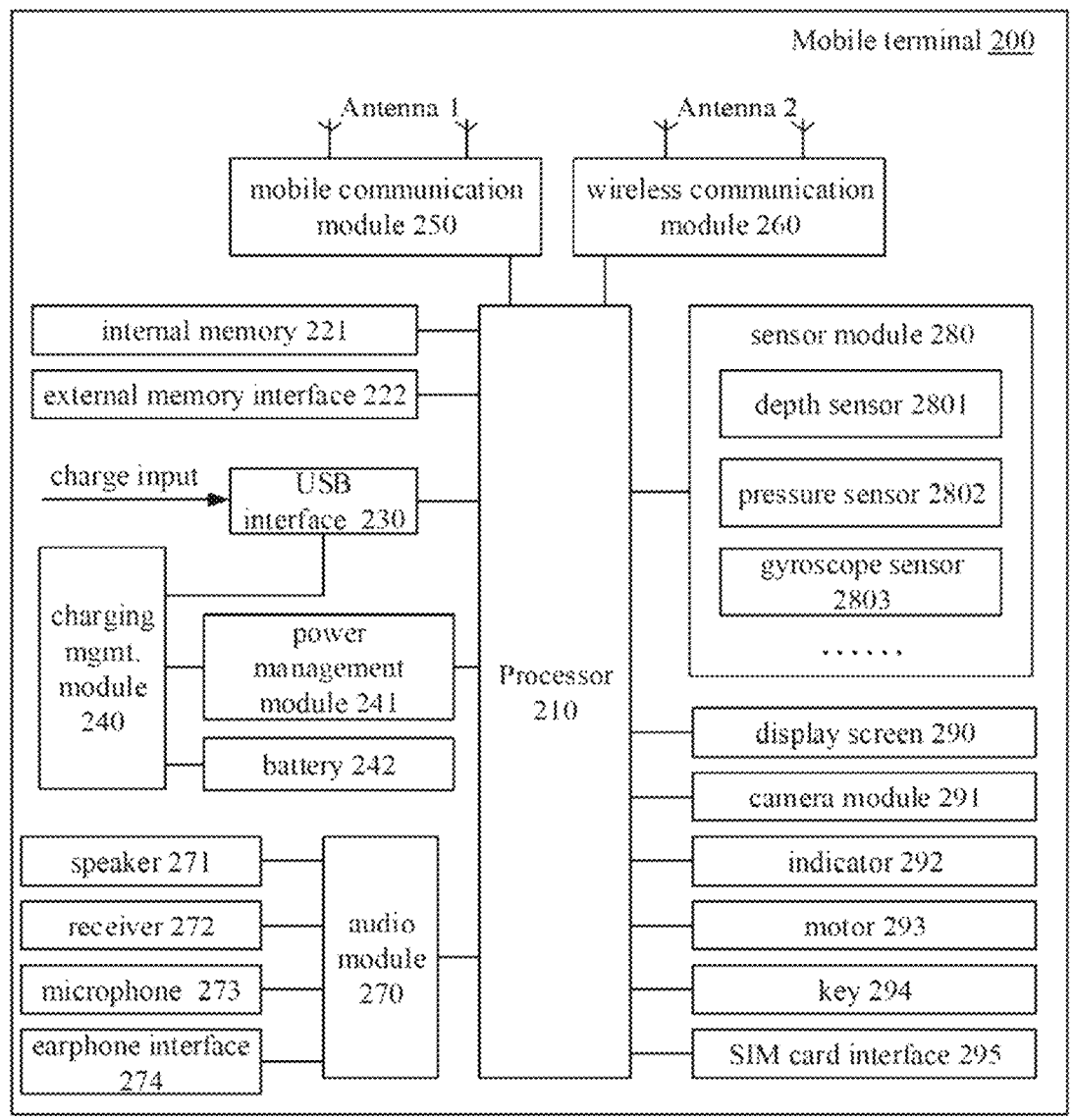
FIG. 2 illustrates a schematic diagram of an electronic device to which embodiments of the present disclosure may be applied.

Hereinafter, the mobile terminal 200 in FIG. 2 is taken as an example to illustrate the structure of the electronic device. It will be understood by those skilled in the art that the configuration in FIG. 2 can also be applied to stationary type devices, in addition to components specifically for mobile purposes. In other embodiments, the mobile terminal 200 may include more or fewer components than shown, or some components may be combined or divided, or have different component arrangements. The illustrated components may be implemented in hardware, software, or a combination of software and hardware. The interface connection relationship between the components is only schematically shown, and does not constitute a structural limitation of the mobile terminal 200. In other embodiments, the mobile terminal 200 may also adopt an interface connection manner different from that in FIG. 2, or a combination of multiple interface connection manners.

As shown in FIG. 2, the mobile terminal 200 may specifically include: a processor 210, an internal memory 221, an external memory interface 222, a universal serial bus (USB) interface 230, a charging management module 240, a power management module 241, a battery 242, an antenna 1, an antenna 2, a mobile communication module 250, a wireless communication module 260, an audio module 270, a speaker 271, a receiver 272, a microphone 273, an earphone interface 274, a sensor module 280, a display screen 290, a camera module 291, an indicator 292, a motor 293, a key 294, a subscriber identification module (SIM) card interface 295, and the like. The sensor module 280 may include a depth sensor 2801, a pressure sensor 2802, a gyroscope sensor 2803, and the like.

The processor 210 may include one or more processing units, for example, the processor 210 may include an application processor (AP), a modem processor, a graphics processing unit (GPU), an image signal processor (ISP), a controller, a video codec, a digital signal processor (DSP), a baseband processor and/or a neural network processor (NPU), and the like. Different processing units may be independent component, or may be integrated in one or more processors.

NPU is a neural network (NN) computing processor. By simulating the structure of biological neural network, such as the transmission mode between neurons in the human brain, it can quickly process the input information and can continuously learn by itself. Applications such as intelligent cognition of the mobile terminal 200 can be implemented through the NPU, such as image recognition, face recognition, speech recognition, text understanding, and the like.

A memory is provided in the processor 210. The memory can store instructions for implementing six modular functions: detection instructions, connection instructions, information management instructions, analysis instructions, data transmission instructions, and notification instructions, and the execution is controlled by the processor 210.

The charging management module 240 is used to receive charging input from the charger. The power management module 241 is used for connecting the battery 242, the charging management module 240 and the processor 210. The power management module 241 receives input from the battery 242 and/or the charging management module 240, and supplies power to the processor 210, the internal memory 221, the display screen 290, the camera module 291, the wireless communication module 260, and the like.

The wireless communication function of the mobile terminal 200 may be implemented by the antenna 1, the antenna 2, the mobile communication module 250, the wireless communication module 260, the modulation and demodulation processor, the baseband processor, and the like. The antenna 1 and the antenna 2 are used for transmitting and receiving electromagnetic wave signals; the mobile communication module 250 may provide a wireless communication solution including 2G/3G/4G/5G applied on the mobile terminal 200; the modulation and demodulation processor can include modulators and demodulators; the wireless communication module 260 can provide wireless local area networks (WLAN) (such as Wireless Fidelity (Wi-Fi) networks), Bluetooth (BT) and other wireless communication solutions. In some embodiments, the antenna 1 of the mobile terminal 200 is coupled with the mobile communication module 250, and the antenna 2 is coupled with the wireless communication module 260, so that the mobile terminal 200 can communicate with the network and other devices through wireless communication technology.

The mobile terminal 200 implements a display function through a GPU, a display screen 290, an application processor, and the like. The GPU is a microprocessor for image processing, and is connected to the display screen 290 and the application processor. The GPU is used to perform mathematical and geometric calculations for graphics rendering. The processor 210 may include one or more GPUs that execute program instructions to generate or change display information.

The mobile terminal 200 can realize the shooting function through the ISP, the camera module 291, the video codec, the GPU, the display screen 290, the application processor, and the like. The ISP is used to process the data fed back by the camera module 291; the camera module 291 is used to capture still images or video; the digital signal processor is used to process digital signals, in addition to processing digital image signals, it can also process other digital signals; and the video codec is used to compress or decompress the digital video, and the mobile terminal 200 may also support one or more kinds of video codecs.

The external memory interface 222 can be used to connect an external memory card, such as a Micro SD card, to expand the storage capacity of the mobile terminal 200. The external memory card communicates with the processor 210 through the external memory interface 222 to realize the data storage function. For example, to store files like music, video and the like in the external memory card.

The internal memory 221 may be used to store computer executable program code, which includes instructions. The internal memory 221 may include a storage program area and a storage data area. The storage program area can store an operating system, an application program required for at least one function (such as a sound playback function, an image playback function, etc.), and the like. The storage data area may store data (such as audio data, contact list, etc.) created during the use of the mobile terminal 200 and the like. In addition, the internal memory 221 may include high-speed random access memory, and may also include non-volatile memory, such as at least one magnetic disk storage device, flash memory device, universal flash storage (UFS), and the like. The processor 210 executes various functional applications and data processing of the mobile terminal 200 by executing instructions stored in the internal memory 221 and/or instructions stored in a memory provided in the processor.

The mobile terminal 200 may implement audio functions through an audio module 270, a speaker 271, a receiver 272, a microphone 273, an earphone interface 274, an application processor, and the like. For example, music playback, recording, and the like.

The depth sensor 2801 is used to acquire depth information of the scene. In some embodiments, the depth sensor may be disposed in the camera module 291.

The pressure sensor 2802 is used to sense pressure signals, and can convert the pressure signals into electrical signals. In some embodiments, the pressure sensor 2802 may be provided on the display screen 290. There are many types of pressure sensors 2802, such as resistive pressure sensors, inductive pressure sensors, capacitive pressure sensors, and the like.

The gyroscope sensor 2803 may be used to determine the motion attitude of the mobile terminal 200. In some embodiments, the angular velocity of the mobile terminal 200 around three axes (i.e., x, y and z axes) may be determined by the gyroscope sensor 2803. The gyroscope sensor 2803 can be used for image stabilization, navigation, and somatosensory game scenes.

In addition, sensors with other functions can also be set in the sensor module 280 according to actual needs, such as an air pressure sensor, a magnetic sensor, an acceleration sensor, a distance sensor, a proximity optical sensor, a fingerprint sensor, a temperature sensor, a touch sensor, an ambient light sensor, a bone conduction sensor, and the like.

The mobile terminal 200 may further include other devices providing auxiliary functions. For example, the keys 294 include a power-on key, a volume key, and the like, and the user can input key signals related to user settings and function control of the mobile terminal 200 through key input. Another example is the indicator 292, the motor 293, the SIM card interface 295, and the like.

In the related art, for a product, product photo detection is performed from different dimensions (whole/partial, high/low resolution, grayscale/color image). During the process of screen production, problems in the aspect of device, parameter, operation, environmental interference or the like will make the products defective. After each stage of process followed by optical (AOI, Automated Optical Inspection) detection, there are may generate many different types of data, e.g., AOI color image, TDI (Time Delayed and Integration) image, DM (digital microcomputer) image, professional operators are required to judge these images for defect levels. With the rise of artificial intelligence algorithms represented by deep learning, an ADC (Automatic defect detection and classification system), in which AI (artificial intelligence) algorithms have been introduced into the process of defect image judging, for automatic detection of defect images, have been developed.

During the production process of screens, in the quality inspection stage, optical AOI equipment will be used to take photos of the circuit on the glass substrate. First, the industrial camera CCD will be used to take pictures of each glass substrate (covered with circuits) to generate the grayscale image of the entire glass substrate, which is the DM image. Only one DM image will be generated for each glass substrate, and the DM image is generally a single-channel grayscale image of 1500×1500 or more. If there is a suspicious defect spot, a microscope is used to capture the TDI image and AOI color image of the spot. The TDI image is generally a single-channel 64×64 grayscale image, which is a "blurred image" at the defect spot. The TDI image is easy to generate and transport as it is small. Approximately 500 TDI images may be generated per glass substrate. The AOI color image is generally a three-channel 1360×1020 RGB image, which is a high-definition display image of defect spot. Because it is not easy to generate and transmit, generally about 150 AOI color images are captured for each glass substrate.

In the production process, after the above three kinds of images of each glass substrate are captured by the AOI equipment, the above three types of images are manually discriminated to determine whether each image has real defects, and identify the specific defect category. In the production of a factory, millions of images are generated every day, which requires a lot of manpower to perform defect level detection. Moreover, due to limited human energy, wrong judgments and missed judgments often occur, which ultimately affects the yield of the product.

Hereinafter, the method and device for detecting defect according to the exemplary embodiments of the present disclosure will be described in detail.

Figure 3:
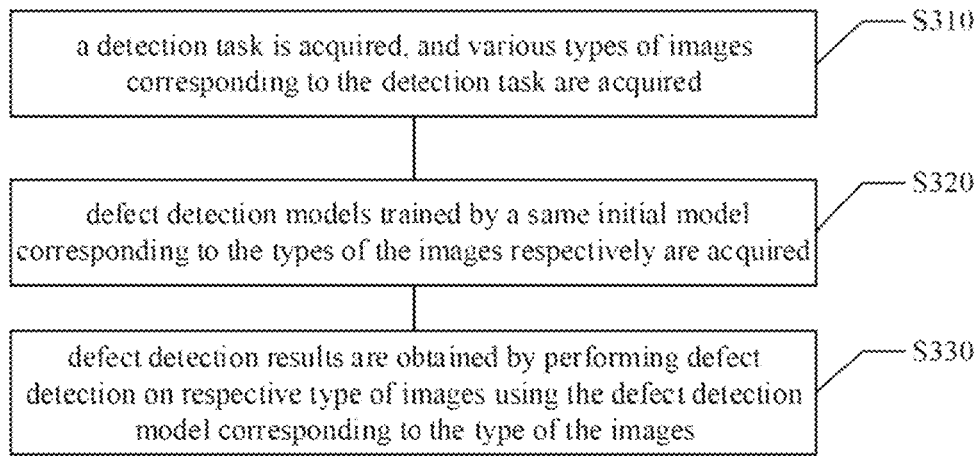
FIG. 3 schematically illustrates a flowchart of a method for detecting defect in an exemplary embodiment of the present disclosure.

FIG. 3 illustrates a flow of a defect detection method in this exemplary embodiment, which includes the below steps.

In step S310, a detection task is acquired, and various types of images corresponding to the detection task are acquired.

In step S320, defect detection models trained by a same initial model corresponding to the types of the images respectively are acquired.

In step S330, defect detection results are obtained by performing defect detection on respective type of images using the defect detection model corresponding to the type of the images.

Compared with the prior art, the present disclosure adopts a defect detection model to implement the detection of product defects, adopts various types of images of the product, and adopts different defect detection models for different types of images. The defect detection models are all trained by the same initial model, that is, the same algorithm can be used to obtain the defect detection models, which saves development resources and reduces the cost of defect detection.

In the step S310, the detection task is acquired, and various types of images corresponding to the detection task are acquired.

In an exemplary embodiment of the present disclosure, the detection task may be acquired first, then product information corresponding to the detection task may be acquired according to the detection task, and then various types of images of the product may be acquired according to the product information. The different types of images may be represented by different resolutions, different channel numbers, or different resolutions and channel numbers.

In this exemplary embodiment, the above-mentioned product information includes information such as product name, product site, etc. The product information can also be customized according to user requirements, which is not specifically limited in this exemplary embodiment. The above-mentioned various types of images may be obtained by taking pictures of the above-mentioned products using cameras with different configuration parameters. Specifically, the above-mentioned various types of images may include DM images, TDI images, and AOI color images corresponding to the products. There is no specific limitation in this exemplary implementation.

In an example implementation of the present disclosure, the product information can be acquired according to a product information field, and the server receives the detection task sent by the training system, and parses the task. In order to get the product name/site name through the detection task, the product information field is included in the detection task. By parsing the field, the server can identify the site name and product name corresponding to the detection task.

In this exemplary embodiment, specifically, to obtain the various types of images corresponding to the product according to the above-mentioned product information, path information corresponding to each type of image in the product information can be obtained first, and then the various types of images corresponding to the product can be obtained from the storage according to the above-mentioned path information.

In this exemplary embodiment, after acquiring different types of images corresponding to the detection tasks, the defect detection method of the present disclosure may further include preprocessing the acquired images of different types. In particular, the number of channels for each type of image is set to be the same. The maximum number of channels in each type of image can be determined first, and the number of channels in all images is set to the above-mentioned maximum number of channels. Then, the size of each type of image can be adjusted to a preset size corresponding to each type.

For example, the various types of images including DM images, TDI images, and AOI color images are taken as examples for detailed description. The DM image and TDI image are single-channel images, while the AOI color image is a three-channel RGB image. In order to compatible with the above three types of images, in the preprocessing operation, the channel expansion processing is performed on the DM image and the TDI image, that is, the single channel is copied into three copies and converted into a three-channel image for processing. It has been verified by experiments that this processing method does not affect the accuracy of the algorithm.

Further, a resolution threshold may be set according to the defect detection model, and the threshold may be determined by the hardware system where the model is located, and may also be customized according to user requirements, which is not specifically limited in this exemplary implementation.

For example, the above-mentioned resolution threshold may be that the shortest side is 1000-1200, for example, 1020, 1036, etc., which is not specifically limited in this exemplary embodiment. Each type of image is scaled to different preset resolutions and processed into a three-channel image, and input to the defect detection model. For example, the DM image will be scaled to a three-channel image with the shortest side of 1200 and input to the defect detection model. Due to the low resolution of the TDI image, excessive magnification will distort the image. Therefore, the TDI image can be scaled to 256×256 three-channel image and input into the defect detection model, and the AOI color map can be changed, for example, to keep 1360×1020, or scaled to three-channel image with the shortest side being greater than or equal to 1000 and input into the defect detection model. At the same time, according to the mean and variance of each data set, each type of image will be standardized accordingly. The preset resolutions corresponding to different types of images can also be customized according to user requirements, which are not specifically limited in this exemplary implementation.

In this exemplary embodiment, a preprocessing parameter modification interface may also be provided for the preprocessing operation, so that the user can adjust the parameter information of the preprocessing operation through the preprocessing parameter modification interface. The preprocessing parameter modification interface may include a resolution modification interface and a channel number modification interface, and other modification interfaces may be added according to user requirements, which are not specifically limited in this example implementation. The user may modify the above the above parameters such as the resolution and the number of channels by the above preprocessing parameter modification interface.

In another exemplary embodiment of the present disclosure, the server may firstly obtain a plurality pieces of product information corresponding to the detection task; obtain images with the same resolution and the same number of channels corresponding to each product information. That is, the detection task includes the task of defect detection for different products, wherein, the different types of images obtained can be different products in the image or different sites. The resolution and number of channels of the images are the same, that is, at least one of the sites and products are different, while the images have the same form.

In step S320, defect detection models trained by a same initial model corresponding to the types of the images respectively are acquired.

In an exemplary embodiment of the present disclosure, the model acquire patch is obtained according to the above-mentioned product and site, and then the defect detection model corresponding to the above-mentioned image type is obtained from the storage according to the above-mentioned image type.

In this exemplary implementation, the above-mentioned various types of defect detection models may be obtained by training from the same initial model. Specifically, an initial model may be obtained first, and then training data corresponding to each type of images may be obtained. The training data may include: normal images and image normal information; and defective images and image defect information. The server may use training data corresponding to each type of images to train the initial model to obtain defect detection models corresponding to respective types of images.

Before training, the parameters of the initial models corresponding to various types of images are exactly the same, and there is no need to design different initial models for various types of images, which saves design costs. The training process is the process of using the training data to modify the model parameters. Therefore, after training, due to the different training data, the configuration parameters of the initial model are modified differently, and defect detection models corresponding to various types of images can be obtained.

For example, the DM image corresponds to the DM model xx, the TDI image corresponds to the TDI model xx, and the AOI color image corresponds to the AOI model xx, where xx represents the version information of the model. The version is determined when the algorithm calls the system incoming model path messages. That is, for each specific algorithmic task, a set of three model information of a specific version is passed in.

In defect detection, the commonly used method is target detection algorithm. In defect detection scenarios, normal images often occupy 60% or more of all images. These normal images have no "target" for target detection algorithms. How to correctly classify normal images and defective images is a major problem in the defect detection scene. The commonly used method is to first classify the images into normal images and defective images, and then input the defective images to the defect detection algorithm for classifying and positioning of the defect. The processing is complicated.

In the defect detection, defects only exist in a small number of samples, and 50% or more of the input images are normal and defect-free images, while the traditional target detection algorithm needs to label the target category and target position in each image. For normal images in defect detection, the required "target" does not exist. Therefore, in this example implementation, the entire image of a normal image is input to the network as a target. In addition to the defect categories, a class of normal images can be added. The "defect" position of this type of image is the entire image. That is, normal images and image normal information are provided in the training data. In order to enable the above defect detection model to solve the classification problem of normal maps and defect maps, the accuracy of normal maps is basically above 95%, and the recall rate is above 85%.

In this exemplary embodiment, the above-mentioned defect detection model is mainly a neural network model based on deep learning. For example, a defect detection model may be based on a feedforward neural network. Feedforward networks can be implemented as acyclic graphs, where nodes are arranged in layers. Typically, a feedforward network topology includes an input layer and an output layer separated by at least one hidden layer. The hidden layer transforms the input received by the input layer into a representation useful for generating the output in the output layer. Network nodes are fully connected to nodes in adjacent layers via edges, but there are no edges between nodes within each layer. Data received at the nodes of the input layer of the feedforward network is propagated (i.e., "feedforward") to the nodes of the output layer via activation functions that compute the states of teach node of the successive layers in the network, and the coefficients are respectively associated with each of the edges connecting these layers. The output of the defect detection model may take various forms, which are not limited by this disclosure. The defect detection model may also include other neural network models, for example, a convolutional neural network (CNN) model, a recurrent neural network (RNN) model, and a generative adversarial network (GAN) model, but is not limited thereto, and other neural network models known to persons in the art may also be used.

Defect detection models usually need to be obtained through training. Training the initial model using the training algorithm described above may include the steps of: selecting a network topology; using a set of training data representing the problem being modeled by the network; and adjusting the weights until the network model represents to have minimum error for all instances of the training data set. For example, during a supervised learning training process for a neural network, the output produced by the network in response to an input representing an instance in a training dataset is compared to the "correct" labeled output for that instance; an error signal representing the difference between the output and the labeled output is calculated; and the weights associated with the connections is adjusted to minimize the error when propagating the error signal through the layers of the network. When the error for each output generated from an instance of the training data set is minimized, this initial model is considered "trained" and defined as a defect detection model, and can be used for AI inference tasks.

In step S330, defect detection results are obtained by performing defect detection on respective type of images using the defect detection model corresponding to the type of the images.

In this exemplary embodiment, the defect influence weights can be set for various types of images according to configuration parameters. The reference defect detection results corresponding respectively to various types of images are obtained by performing defect detection on the various types of images using the defect detection models corresponding to the various types of each image. The defect detection result is determined by fusion according to the defect influence weight and the reference defect detection result.

For example, the defect influence weight of DM image, TDI image, and AOI color image can be set to 1:2:7, or 1:3:6, and can also be customized according to user needs. In this example, there is no specific limitation in the implementation.

In an exemplary embodiment, defect detection results are obtained by performing defect detection on various types of images using defect detection models corresponding to the types of images, and fusion processing may not be performed after the defect detection results of various types of images are acquired.

When performing defect detection on the above-mentioned DM image, TDI image, and AOI color image, the defect detection models obtained by training different neural network models can be used for separate detection, so as to obtain the defect category. However, there are differences on the defect recognition accuracy and consistency.

In the present disclosure, different types of pictures of the same product are separately trained through the same initial neural network model, and designs such as specific pre-processing and post-processing are provided, which greatly improves the accuracy of defect detection. The above-mentioned preprocessing process has been described in detail above. Specifically, it may include setting the number of channels of the above-mentioned various types of images to be the same, and scaling each type of pictures to different preset resolutions, etc. The processing operation may include setting defect influence weights on various types of images according to configuration parameters; using defect detection models corresponding to the various types of image to perform defect detection on various types of images to obtain reference defect detection results corresponding to each type of image respectively; and determining the defect detection result by fusion according to the defect influence weight and the reference defect detection result.

It should be noted that the above-mentioned preprocessing and post-processing have been described in detail above, and therefore are not repeated here.

Figure 5:
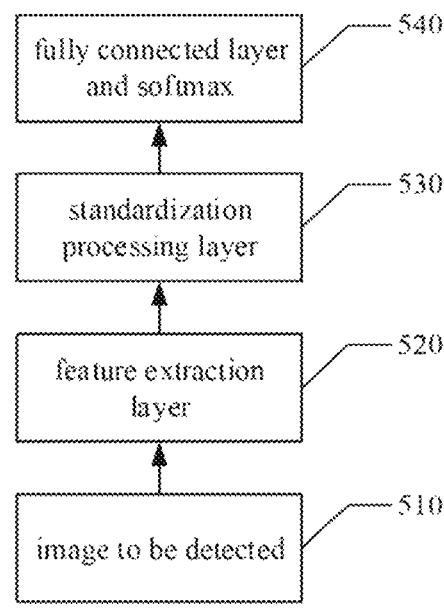
FIG. 5 schematically illustrates an architecture diagram of a defect policy model in an exemplary embodiment of the present disclosure.

In this exemplary embodiment, as shown in FIG. 5, the above defect detection model may belong to a two-stage target detection algorithm, and may specifically include a feature extraction network and a defect identification network. The feature extraction network may be used firstly to perform feature extraction on the image to obtain the feature image, and the feature image is standardized.

Specifically, the feature extraction network is used for feature extraction of the image to be detected 510, at the feature extraction layer 520, which includes deep learning basic units such as convolutional layers and pooling layers. Specifically, it may be similar typical VGG module, residual structured ResNet model and lightweight MobileNet model depends on specific project requirements. In this example, a convolutional network including blocks of residual structures is used to extract features, and the rest of the structures are external exposed interfaces, which may be selected in the configuration file. The feature image obtained above may be sent to the candidate frame extraction network, and the candidate frames in the image can be preliminarily screened into foreground frames (defective) and background frames (defect-free), and the coordinates of the candidate frames can be regressed and adjusted. That is, the target feature image is obtained by screening the feature image, and the defect category and coordinates of the target candidate feature image are determined. The defect detection result is obtained according to a preset screening strategy and the defect category and coordinates of the target feature image.

In this exemplary embodiment, the standardization processing layer 530 is used to perform standardizing processing on the above-mentioned target feature image, and ROI Pooling or ROI Align may be used, which is not particularly limited according to the exemplary embodiment. The candidate frame is processed into a uniform size and input to the network for defect recognition. In this example, ROI Align is used for standardizing processing. In this example implementation, a standardizing processing parameter modification interface may be configured, so that the user may adjust the parameter information of the standardizing processing through the standardizing processing parameter modification interface.

In this exemplary embodiment, the defect recognition network is used to classify defects according to the standardized feature images to obtain defect categories of each feature image, and determine the coordinates of each feature image. The defect detection results are obtained according to the defect categories and coordinates.

Specifically, the above-mentioned standardized feature images can be input into the defect identification network, which is mainly includes a fully connected layer and softmax 540. The defect identification network does not need a convolutional layer, and providing the fully connected layer instead of a convolutional layer will greatly reduce the model size. In the defect recognition network structure, the defect categories can be classified and the coordinates can be regressed.

About 2000 feature images with defect categories and coordinates can be obtained. The candidate feature images are filtered through the NMS algorithm, and then the threshold adjustment strategy is performed. According to the results of multiple experiments on each type of image, a special threshold screening strategy is proposed, which selects an appropriate threshold for each category in each image to screen the defect category to obtain the target feature image. The above threshold can be customized according to user requirements, and no specific modification is made in this example implementation.

In this exemplary embodiment, the NMS algorithm is a general algorithm in face recognition and defect detection algorithms, and is mainly used to filter a large number of feature images processed by the algorithm according to whether the coordinates overlap and the confidence scores. The specific process is: the NMS algorithm receives thousands of feature image coordinates processed by the previous algorithm and the confidence score of each feature image, first extracts the feature image with the highest confidence, and calculates the intersection ratio of the extracted feature image with the rest of the feature images successively. The feature images that exceed the threshold (exceeding the threshold indicates that the two feature images have a high degree of coincidence, and the same object is in the feature images), and then save the feature image with the highest score. Then, the feature image with the highest confidence is extracted from the rest feature images, and the previous step is repeated until the end of the cycle. In this way, non-overlapping feature images on each image can be obtained.

In this exemplary embodiment, the number of target feature images obtained by screening may be 10, 20, etc., which is not specifically limited in this exemplary embodiment.

In this exemplary embodiment, the defect detection result can also be obtained according to the screening strategy and the defect category and coordinates of the target feature image. Specifically, in the finally obtained multiple target feature images, according to the importance of the defect to the service and the frequency of defect occurrence, a preset screening strategy is used to determine and select the final defect category and coordinates. The preset screening strategy includes that if the category appears in multiple final target feature images, it is determined as the category; if two or more specific categories appear in the candidate frame at the same time, one of them is selected as the category; the highest ranking of the target feature images is selected as the category; if all the target feature images are normal categories, select the normal category, and the "defect" coordinates are the original picture size. The above-mentioned preset screening strategy can also be customized according to user needs, that is, a customized result post-processing method, to cope with diverse image types and scenarios, which is not specifically limited in this example implementation.

In an exemplary implementation of the present disclosure, a defect category and the coordinates of this category can be given to the DM image, TDI image, and AOI color image in each of the above tasks, and then the obtained results can be packaged and pushed to the user operating system for manual review.

Figure 4:
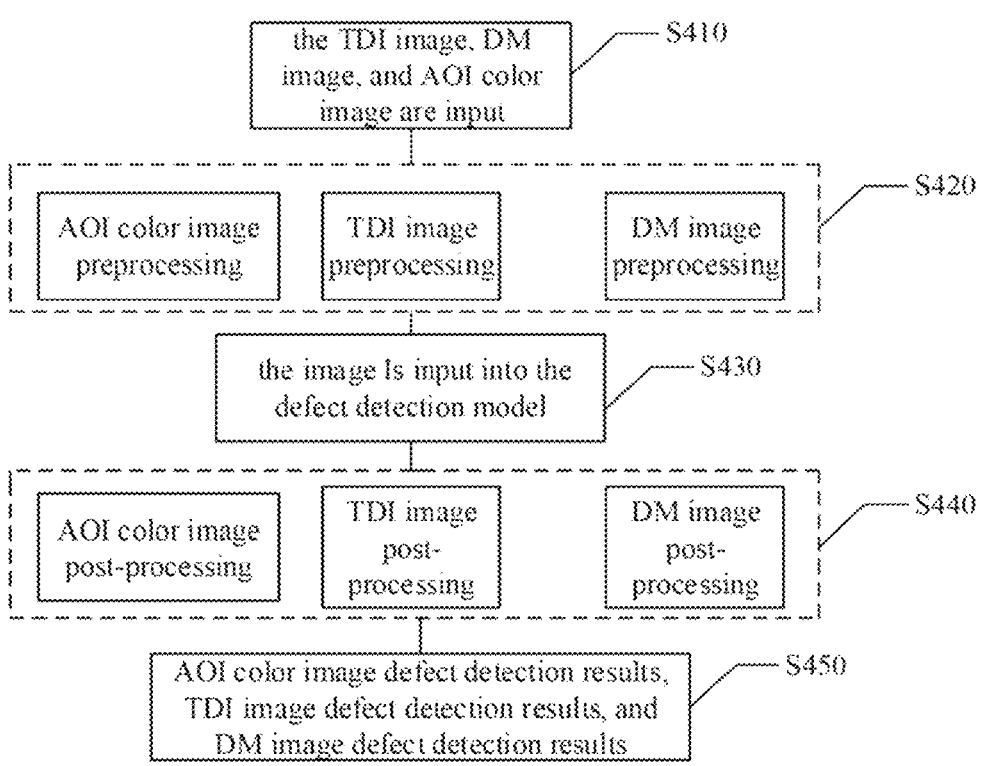
FIG. 4 schematically illustrates a flowchart of an algorithm in the method for detecting defect in an exemplary embodiment of the present disclosure.

In this exemplary embodiment, referring to FIG. 4, the above-mentioned defect detection method is introduced by taking various types of images including AOI color image, TDI image, and DM image as an example. Firstly, step S410 is performed, and the TDI image, DM image, and AOI color image are input. Afterwards, step S420 is performed, i.e., the preprocessing operation, which includes AOI color image preprocessing, TDI image preprocessing, and DM image preprocessing. The specific process of the preprocessing operation has been described in detail above, so it will not be repeated here. Afterwards, step S430 can be performed to input the image into the defect detection model, and then step S440 and step S450 are performed, post-processing and obtaining AOI color image defect detection results, TDI image defect detection results, and DM image defect detection results. The post-processing includes AOI color image post-processing, TDI image post-processing, and DM image post-processing, that is, the above-mentioned defect detection results are obtained after post-processing of using the output of the model.

Figure 6:
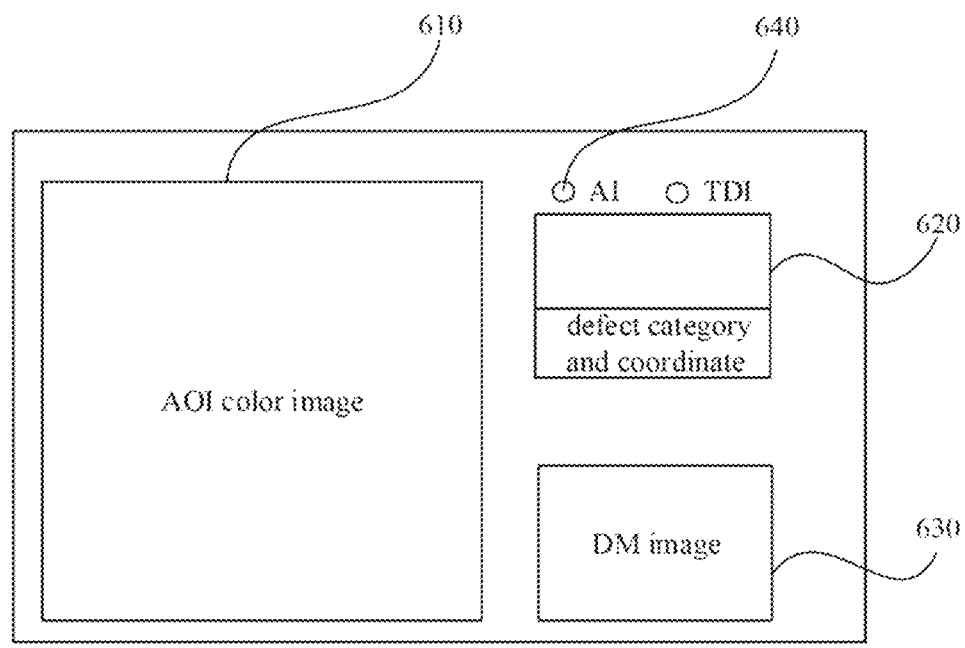
FIG. 6 schematically illustrates a user interface diagram in an exemplary embodiment of the present disclosure.

Referring to FIG. 6, the largest display area on the interface operated by the user is the AOI color image 610, and in the upper right corner display area 620, it can use the switch icon 640 to switch the AOI color image between the AI-recognized image and the AI-unrecognized image, as well as the TDI image. The defect categories can be given below the thumbnails of AI-recognized images and TDI images. The operator only needs to browse the thumbnails roughly, which greatly increases the operator's image judgment speed. For images that are not recognized by AI, the operator needs to judge the image in the middle display area, and give the corresponding defect category of the image. The DM image can be displayed in the display area 630 in the lower right corner, the defects are given above the picture, and the operator's re-judgment function is provided.

To sum up, the defect detection method in the present disclosure provides an efficient and convenient processing method for the DM image, TDI image, and AOI image of screen production inspection based on specific scenarios. The joint processing of multiple different types of images greatly improves the image detection efficiency and the subsequent manual work efficiency. At the same time, reasonable reuse of the same algorithm network and extraction of key parameters enhances the scalability of the algorithm. Finally, the classification of normal images and defective images, and the refined classification of defect categories and positioning of the defective images are integrated into the same end-to-end task process, which simplifies the task difficulty and improves the task processing speed.

It should be noted that the above-mentioned drawings are only schematic illustrations of the processes included in the method according to the exemplary embodiment of the present disclosure, and are not intended to be limiting. It is easy to understand that the processes shown in the above figures do not indicate or limit the chronological order of these processes. In addition, it is also readily understood that these processes may be performed synchronously or asynchronously in multiple modules, for example.

Figure 7:
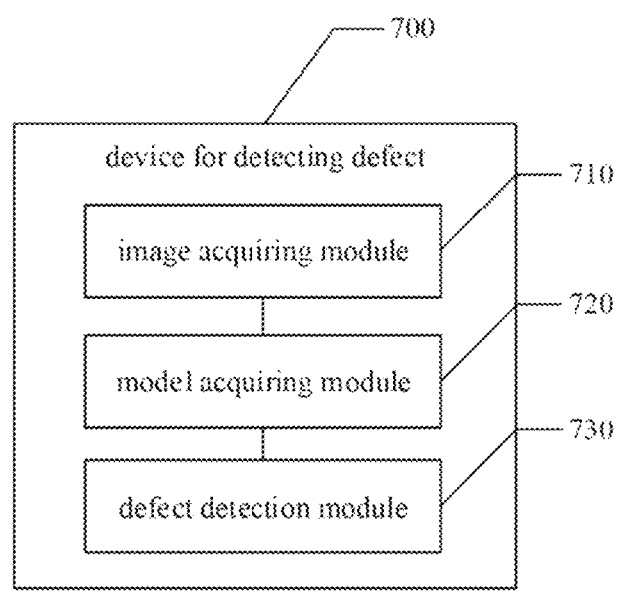
FIG. 7 schematically illustrates a schematic diagram of the composition of the device for the defect detection method in an exemplary embodiment of the present disclosure.

Further, referring to FIG. 7, the implementation of the present embodiment further provides a device for detecting defect 700, which includes an image acquiring module 710, a model acquiring module 720 and a defect detection module 730.

The image acquiring module 710 may be used to acquire a detection task, and acquire various types of images corresponding to the detection task.

In an example implementation, the image acquiring module 710 may extract a product information field in the detection task to acquire the product information, and acquire the product information corresponding to the detection task and acquire various types of images according to the product information, and specifically acquire the various types of images corresponding to the product information. The various types of images are obtained by using cameras with different configuration parameters to take pictures of the product, wherein, the various types of images include one or more of the AOI color image, TDI image and DM image of the product.

The image acquiring module 710 may also perform a preprocessing operation on each type of image, so that the number of channels of each type of image is the same. Specifically, the maximum number of channels in each type of image can be determined, and the various types of images are preprocessed such that the number of channels of each type of image is set to the maximum number of channels. The resolution of each type of image is adjusted to the preset resolution corresponding to the respective type. A preprocessing parameter modification interface can also be provided for the preprocessing operation, so that the user can adjust the parameter information of the preprocessing operation through the preprocessing parameter modification interface.

In another exemplary embodiment of the present disclosure, the image acquiring module 710 may acquire information of a plurality of products corresponding to the detection task, and acquire images with the same resolution and the same number of channels corresponding to each of the product information.

The model acquiring module 720 may acquire defect detection models trained by the same initial model corresponding to the types of the images respectively.

The defect detection module 730 is configured to perform defect detection on various types of images by using the defect detection models corresponding to the types of the images to obtain defect detection results.

The defect detection models corresponding to the various types of the images are trained by the same initial model.

In an exemplary embodiment of the present disclosure, the defect detection model includes a feature extraction network and a defect identification network. The defect detection module 730 can use the feature extraction network to perform feature extraction on various types of images to obtain feature images; standardize the feature images; obtain the defect categories of each feature image by classifying defects of the standardized feature image using the defect recognition network, and determine the coordinates of each feature image; and obtain the defect detection results according to the defect categories and coordinates.

In this exemplary embodiment, the defect detection module 730 may also be configured with a standardized processing parameter modification interface, so that the user can adjust the parameter information of the standardized processing through the standardized processing parameter modification interface.

In this exemplary embodiment, when the defect detection result is obtained according to the defect category and the coordinates, the defect detection module 730 can filter the feature image to obtain the target feature image, and determine the defect category and coordinates of the target candidate feature image. The defect detection results are obtained according to preset screening strategy and the defect category and coordinates of the target feature image. The defect detection module 730 can calculate the confidence level of each feature image, and screen the feature images according to the confidence level by the NMS algorithm to obtain the target feature image.

In this exemplary embodiment, the defect detection module 730 may also set defect influence weights for various types of images according to configuration parameters; perform defect detection on various types of images by using defect detection models corresponding to the types of images to obtain reference defect detection results corresponding respectively to the various types of images; and determine the defect detection results according to the defect influence weight and the reference defect detection results.

The specific details of each module in the above-mentioned device have been described in detail in the method part of the specification, and the undisclosed details can refer to the method part of the specification, and thus will not be repeated.

As will be appreciated by one skilled in the art, various aspects of the present disclosure may be implemented as a system, method or program product. Therefore, various aspects of the present disclosure can be embodied in the following forms: a complete hardware implementation, a complete software implementation (including firmware, microcode, etc.), or a combination of hardware and software aspects, which may be collectively referred to herein as implementations "circuit", "module" or "system".

Exemplary embodiments of the present disclosure also provide a computer-readable storage medium on which a program product capable of implementing the above-described method of the present specification is stored. In some possible implementations, various aspects of the present disclosure can also be implemented in the form of a program product, which includes program code, when the program product is executed on a terminal device, the program code is used to cause the terminal device to execute the steps of method according to various embodiments described in the above description of the present disclosure.

It should be noted that the computer-readable medium shown in the present disclosure may be a computer-readable signal medium or a computer-readable storage medium, or any combination of the above two. The computer-readable storage medium can be, for example, but not limited to, an electrical, magnetic, optical, electromagnetic, infrared, or semiconductor system, apparatus or device, or a combination of any of the above. More specific examples of computer readable storage media may include, but are not limited to, electrical connections with one or more wires, portable computer disks, hard disks, random access memory (RAM), read only memory (ROM), erasable programmable read only memory (EPROM or flash memory), optical fiber, portable compact disk read only memory (CD-ROM), optical storage devices, magnetic storage devices, or any suitable combination of the above.

In the present disclosure, a computer-readable storage medium may be any tangible medium that contains or stores a program that can be used by or in conjunction with an instruction execution system, apparatus, or device. In the present disclosure, however, a computer-readable signal medium may include a data signal propagated in baseband or as part of a carrier wave with computer-readable program code embodied thereon. Such propagated data signals may take a variety of forms, including but not limited to electromagnetic signals, optical signals, or any suitable combination of the foregoing. A computer-readable signal medium can also be any computer-readable medium other than a computer-readable storage medium that can transmit, propagate, or transport the program for use by or in connection with the instruction execution system, apparatus, or device. Program code embodied on a computer readable medium may be transmitted using any suitable medium including, but not limited to, wireless, wireline, optical fiber cable, RF, etc., or any suitable combination of the foregoing.

Furthermore, program code for performing the operations of the present disclosure may be written in any combination of one or more programming languages, including object-oriented programming languages such as Java, C++, etc., as well as conventional procedural programming language— such as the "C" language or similar programming language. The program code may execute entirely on the user's computing device, partly on the user's device, as a stand-alone software package, partly on the user's computing device while partly on a remote computing device, or entirely on the remote computing device or server execute on. Where remote computing devices are involved, the remote computing devices may be connected to the user computing device over any kind of network, including a local area network (LAN) or wide area network (WAN), or may be connected to an external computing device (e.g., using an Internet service provider business via an Internet connection).

Other embodiments of the present disclosure will readily conceivable to those skilled in the art upon consideration of the specification and practice of the invention disclosed herein. This application is intended to cover any variations, uses, or adaptations of the present disclosure that follow the general principles of the present disclosure and include common knowledge or techniques in the technical field not disclosed by the present disclosure. The specification and examples are to be regarded as exemplary only, with the true scope and spirit of the disclosure being indicated by the claims.

It is to be understood that the present disclosure is not limited to the precise structures described above and illustrated in the accompanying drawings, and that various modifications and changes may be made without departing from the scope thereof. The scope of the present disclosure is limited only by the appended claims.

What is claimed is:

1. A method for detecting defect, comprising:
acquiring a detection task, and acquiring various types of images corresponding to the detection task captured by an optical device on a display substrate during a production process of the display substrate;
acquiring defect detection models trained by a same initial model corresponding to the types of the images respectively; and
obtaining defect detection results by performing defect detection on respective type of images using the defect detection model corresponding to the type of the images.

2. The method according to claim 1, wherein the acquiring various types of images corresponding to the detection task comprises:
obtaining product information corresponding to the detection task; and obtaining the various types of images according to the product information.

3. The method according to claim 2, wherein the obtaining the various types of images according to the product information comprises:
- obtaining the various types of images corresponding to a same product corresponding to the product information,
- wherein the various types of images are obtained by taking pictures of the product using cameras with different configuration parameters, and
- wherein the configuration parameters comprise one or more of resolution, color and zoom factor.

4. The method according to claim 3, wherein the method further comprises:
- determining a maximum number of channels in each of the various types of images; and
- preprocessing the various types of images and setting a number of channels of each of various types of images to the maximum number of channels.

5. The method according to claim 4, wherein the preprocessing the various types of images further comprises:
- determining a resolution threshold according to the defect detection model; and
- adjusting resolutions of the various types of images according to the resolution threshold.

6. The method according to claim 5, further comprising:
- providing a preprocessing parameter modification interface for the preprocessing, to allow a user to adjust parameter information of the preprocessing by the preprocessing parameter modification interface.

7. The method according to claim 3, wherein the various types of images comprise one or more of an AOI color image, a TDI image, and a DM image of the product.

8. The method according to claim 3, wherein the obtaining defect detection results by performing defect detection on respective type of images using the defect detection model corresponding to the type of the images comprises:
- setting defect influence weights on the various types of images according to the configuration parameters;
- obtaining reference defect detection results corresponding respectively to the various types of images by performing defect detection on the various types of images using the defect detection model corresponding to each type of the images; and
- determining the defect detection results according to the defect influence weights and the reference defect detection results.

9. The method according to claim 2, wherein the obtaining product information corresponding to the detection task comprises:
- extracting a product information field in the detection task to obtain the product information.

10. The method according to claim 1, wherein the defect detection results comprise image normal information or image defect information.

11. The method according to claim 1, wherein the defect detection model comprises a feature extraction network and a defect identification network, and the obtaining defect detection results by performing defect detection on respective type of images using the defect detection model corresponding to the type of the images comprises:
- obtaining feature images by performing feature extraction on the various types of images using the feature extraction network, and standardizing the feature images;
- obtaining a defect category of each feature image by performing defect classifying according to standardized feature images using the defect identification network, and determining coordinates of each feature image; and
- obtaining the defect detection result according to the defect category and the coordinates.

12. The method according to claim 11, further comprising:
- providing a standardizing parameter modification interface, to allow a user to adjust parameter information of the standardizing by the standardizing parameter modification interface.

13. The method according to claim 11, wherein the obtaining the defect detection result according to the defect category and the coordinates comprises:
- screening the feature images to obtain a target feature image, and determining the defect category and the coordinates of the target candidate feature image; and
- obtaining the defect detection result according to a preset screening strategy and the defect category and the coordinates of the target candidate feature image.

14. The method according to claim 13, wherein the screening the feature images to obtain the target feature image comprises:
- calculating confidence level of each of the feature images, and
- screening the feature images by using an NMS algorithm according to the confidence level to obtain the target feature image.

15. A non-transitory computer readable storage medium on which a computer program is stored, and when the computer program is executed by a processor, a method for detecting defect is implemented, which comprises:
- acquiring a detection task and acquiring various types of images corresponding to the detection task captured by an optical device on a display substrate during a production process of the display substrate;
- acquiring defect detection models trained by a same initial model corresponding to the types of the images respectively; and
- obtaining defect detection results by performing defect detection on respective type of images using the defect detection model corresponding to the type of the images.

16. An electrical device comprising:
- a processor; and
- a memory, configured to store one or more programs, and when the one or more programs are executed by a processor, causes the processor to:
- acquire a detection task, and acquiring various types of images corresponding to the detection task captured by an optical device on a display substrate during a production process of the display substrate;
- acquire defect detection models trained by a same initial model corresponding to the types of the images respectively, and
- obtain defect detection results by performing defect detection on respective type of images using the defect detection model corresponding to the type of the images.

17. The electrical device according to claim 16, wherein the processor is further caused to:
- obtain product information corresponding to the detection task; and
- obtain the various types of images according to the product information.

18. The electrical device according to claim 17, wherein the processor is further caused to:

obtain the various types of images corresponding to a same product corresponding to the product information, wherein the various types of images are obtained by taking pictures of the product using cameras with different configuration parameters, and wherein the configuration parameters comprise one or more of resolution, color and zoom factor.

19. The electrical device according to claim 18, wherein the processor is further caused to:

determine a maximum number of channels in each of the various types of images; and preprocess the various types of images and setting a number of channels of each of various types of images to the maximum number of channels.

\* \* \* \* \*